United States Patent [19]
Palazzo

[11] Patent Number: 6,119,887
[45] Date of Patent: Sep. 19, 2000

[54] DOUBLE WALL STORAGE TANK HAVING AN EXTRUDED OUTER SHEATH AND END CAPS AND A METHOD FOR MAKING SAME

[75] Inventor: David T. Palazzo, Tampa, Fla.

[73] Assignee: Titan Technologies (USA), Inc., Tampa, Fla.

[21] Appl. No.: 08/928,386

[22] Filed: Sep. 12, 1997

Related U.S. Application Data

[63] Continuation-in-part of application No. 08/735,610, Oct. 23, 1996, Pat. No. 5,816,435.

[51] Int. Cl.[7] .................................................. B65D 6/00
[52] U.S. Cl. ...................... 220/586; 220/590; 220/62.22; 427/407.1
[58] Field of Search ................................. 220/586, 588, 220/589, 590, 591, 4.13; 156/171; 427/407.1, 407.3, 409

[56] References Cited

U.S. PATENT DOCUMENTS

| | | | |
|---|---|---|---|
| Re. 34,203 | 3/1993 | Palazzo | 220/445 |
| 3,616,006 | 10/1971 | Landgraf et al. | 156/188 |
| 3,687,765 | 8/1972 | MacLean et al. | 156/187 |
| 3,802,908 | 4/1974 | Emmons | 117/72 |
| 4,130,453 | 12/1978 | Hollister | 156/187 |
| 4,178,200 | 12/1979 | Hakert et al. | 156/187 |
| 4,523,454 | 6/1985 | Sharp | 73/49.2 |
| 4,596,619 | 6/1986 | Marks | 220/591 X |
| 4,607,522 | 8/1986 | Sharp | 73/49.2 |
| 4,640,439 | 2/1987 | Palazzo | 220/445 |
| 4,644,627 | 2/1987 | Palazzo | 29/423 |
| 4,655,367 | 4/1987 | Palazzo | 220/445 |
| 4,660,738 | 4/1987 | Ives | 220/591 X |
| 4,708,015 | 11/1987 | Sharp | 73/49.2 |
| 4,744,137 | 5/1988 | Palazzo | 29/455 R |
| 4,780,946 | 11/1988 | Palazzo | 29/455.1 |
| 4,780,947 | 11/1988 | Palazzo | 29/455.1 |
| 4,927,050 | 5/1990 | Palazzo | 220/445 |
| 5,439,711 | 8/1995 | Vu et al. | 427/430.1 |
| 5,494,183 | 2/1996 | Sharp | 220/469 |
| 5,816,435 | 10/1998 | Palazzo | 220/586 |

OTHER PUBLICATIONS

Brochure entitled: *The DUVAL Pipeline Protection Philosophy* by T.A. Pfaff.
Brochure entitled: Extrusion Technology, by Genca (1995).
Brochure entitled: *Thermoplastic Powder Coatings and Equipment*, by Plastic FLAMECOAT Systems (no date).
Brochure entitled: *Advanced Technology for Industrial Products Production*, by Advanced Plasma Systems, Inc. (no date).
Product Catalog of Allibert Rotomolding of Barcelona Spain, pp. 1–12.
Brochure entitled: Plastic Welding With Plastotherm Portable Extruders; by MUNSCH (no date).
Bonding Solutions, by Master Bond Inc. (no date).
Technical Service Memorandum entitled: *Surface Treatment of Marlex Polyolefins for Decorating and Adhesive Bonding*, by Phillips Chemical Company (Aug. 1979).

*Primary Examiner*—Steven Pollard
*Attorney, Agent, or Firm*—Carlton Fields et al.

[57] ABSTRACT

A double wall tank for the storage of liquids is manufactured from a rigid, inner tank by helically extruding a synthetic resin outer sheath over the sidewall portion inner tank while preventing bonding between the extruded outer sheath and the inner tank, with outer end portions that are sealingly bonded to the outer sheath sidewall portion.

15 Claims, 7 Drawing Sheets

DOUBLE WALL STORAGE TANK HAVING AN EXTRUDED OUTER SHEATH AND END CAPS AND A METHOD FOR MAKING SAME

RELATED APPLICATION

This application is a continuation-in-part of application Ser. No. 08/735,610, which was filed Oct. 23, 1996, now U.S. Pat. No. 5,816,435, entitled Double Wall Storage Tank Having an Extruded Outer Sheath and A Method For Making Same, now pending.

FIELD OF INVENTION

This invention relates to tanks for the storage of liquids, and more particularly to multiple wall tanks for the storage of liquids. Even more specifically, the invention relates to a multiple wall storage tank having an extruded outer sheath of an extruded synthetic resin material and a method for making such tank.

BACKGROUND OF THE INVENTION

Tanks for the storage of liquids have been constructed in a variety of ways from a variety of materials. In one common application, the storage of hydrocarbons, such as gasoline and other petroleum products, the tanks have conventionally been fabricated out of steel or fiberglass, most commonly with a single rigid wall. In many applications, this construction has proved reasonably satisfactory, with such tanks functioning properly for many years before requiring repair or replacement. However, the increasing age of many of the tanks currently in place is beginning to present serious environmental dangers. Many of the older steel tanks buried underground have rusted and are beginning to leak, thus releasing the petroleum materials into the ground where they may seep into and pollute underground water supplies. While rust-proof, some fiberglass tanks have also exhibited leakage, causing similar problems.

One of the primary problems with leaking storage tanks has been the difficulty or inability to ascertain when or if such leaks are occurring from a given tank. Because the excavation and removal of such a storage tank, which may contain thousands of gallons of fuel, is an expensive and difficult undertaking, such an operation is difficult to justify unless there is some evidence of actual leakage.

Because of the increasing potential danger of leaking storage tanks, particularly in communities that utilize ground water for public consumption, many municipalities have implemented or plan to implement ordinances requiring the use of double wall storage tanks underground and requiring replacement of existing single wall tanks. While the installation of a conventional double wall tank in a new facility entails no great difficulty and a generally manageable increase in cost over a single wall tank, a heavy burden exists for complying with such ordinances by replacing existing sound, single wall tanks with double wall tanks. This burden has prompted the search for methods of fabricating relatively inexpensive double wall or multi-wall tanks. This burden has also given impetus to the search for a method of remanufacturing existing single wall tanks into double or multi-wall assemblies with means for detecting the presence of any leaks into the space between the walls.

Several methods for manufacturing double wall tank assemblies have been developed, including that disclosed by David T. Palazzo, the inventor of the present invention, in U.S. Pat. No. 4,640,439 and its progeny. These patents generally disclose applying a spacing material over a rigid inner tank and bonding resin impregnated glass fiber mats to the exterior surface of the inner tank to form a double wall tank. While conventional glass fiber provides a relatively effective and inexpensive outer sheath, other materials, such as polyolefins, exist that may provide a convenient and cost effective alternative to forming a substantially liquid impervious outer shell around the rigid inner tank.

SUMMARY OF THE INVENTION

In view of the foregoing, it is an object of the present invention to provide an economical method of manufacturing a double wall storage tank from a rigid, single wall tank. It is a further object of the invention to provide a multiple wall storage tank having a generally rigid, liquid-impervious outer sheath that is disengaged from at least a substantial portion of the inner tank. Another object of the present invention is to provide a double tank with outer end caps fused to the outer jacket sidewall. Still another object of the present invention is to provide an efficient and relatively simple method of manufacturing a multiple wall storage tank from a rigid, single wall tank.

To achieve these and other objects that will become readily apparent to those skilled in the art, this invention provides a multiple wall tank for the storage of liquid from a substantially rigid inner tank. The tank comprises a generally rigid inner tank having an elongated cylindrical side wall portion, end portions generally transverse to the sidewall portion and a longitudinal central axis extending through the inner tank end portions, with each inner tank end portion having a perimeter edge and a predetermined outer diameter. The outer sheath of the tank is formed by attaching outer end portions of a synthetic resin material positioned adjacent and in overlying relation to the inner tank end portions, with each outer end portion having a predetermined diameter at least generally equal to the diameter of the respective inner tank end portion and having a perimeter edge positioned adjacent the perimeter edge of the respective inner tank end portions to define a shoulder. The outer sheath also includes a cylindrical sidewall portion surrounding the inner tank sidewall portions and the shoulder, which are formed by helically extruding an outer sheath of a plurality of partially overlapping layers of a second synthetic resin material around the inner tank and each shoulder, with at least a substantial portion of the outer tank sidewall portion being spaced from the inner tank to provide for substantially free flow of liquids between the inner tank and the outer sheath. As the outer sheath sidewall portion is extruded an additional plurality of layers of the molten synthetic resin material are applied around the inner tank proximal to and over the shoulder portion, with a portion of the synthetic resin material of the outer sheath sidewall portion being sealingly bonded to a portion of the outer end portions proximal each shoulder, thereby defining a substantially liquid impervious seal between the outer sheath cylindrical sidewall portions and the outer tank end portions.

BRIEF DESCRIPTION OF THE DRAWINGS

Particularly preferred embodiments of the present invention will be described in detail below in connection with the following drawings in which.

DETAILED DESCRIPTION OF PREFERRED EMBODIMENTS

Figure 1:
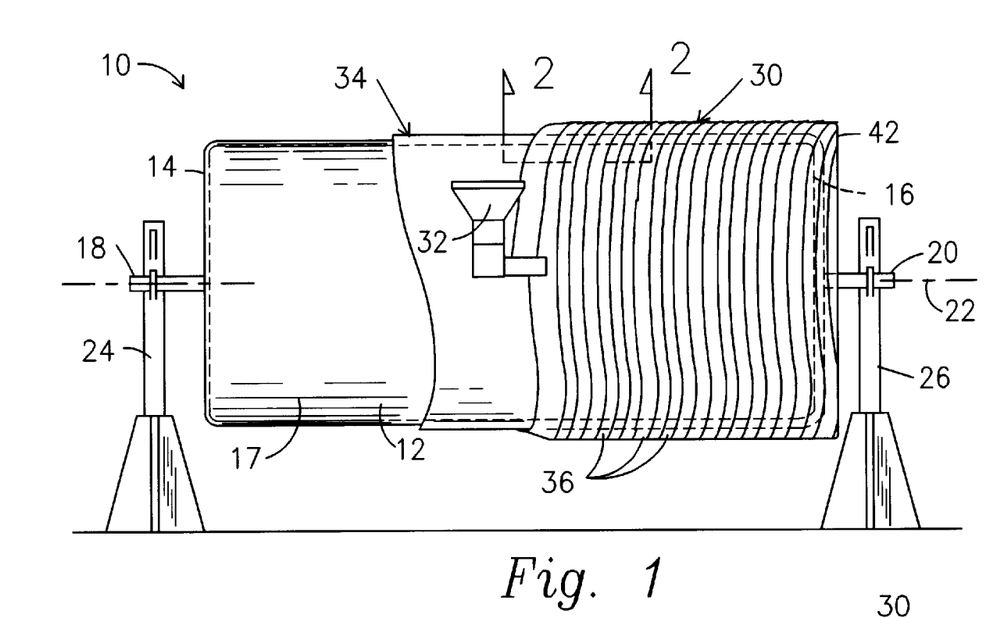
FIG. 1 is a side elevation, partially in section, of a preferred embodiment of a tank according to the present invention, illustrating various steps in the fabrication process.
Figure 6:
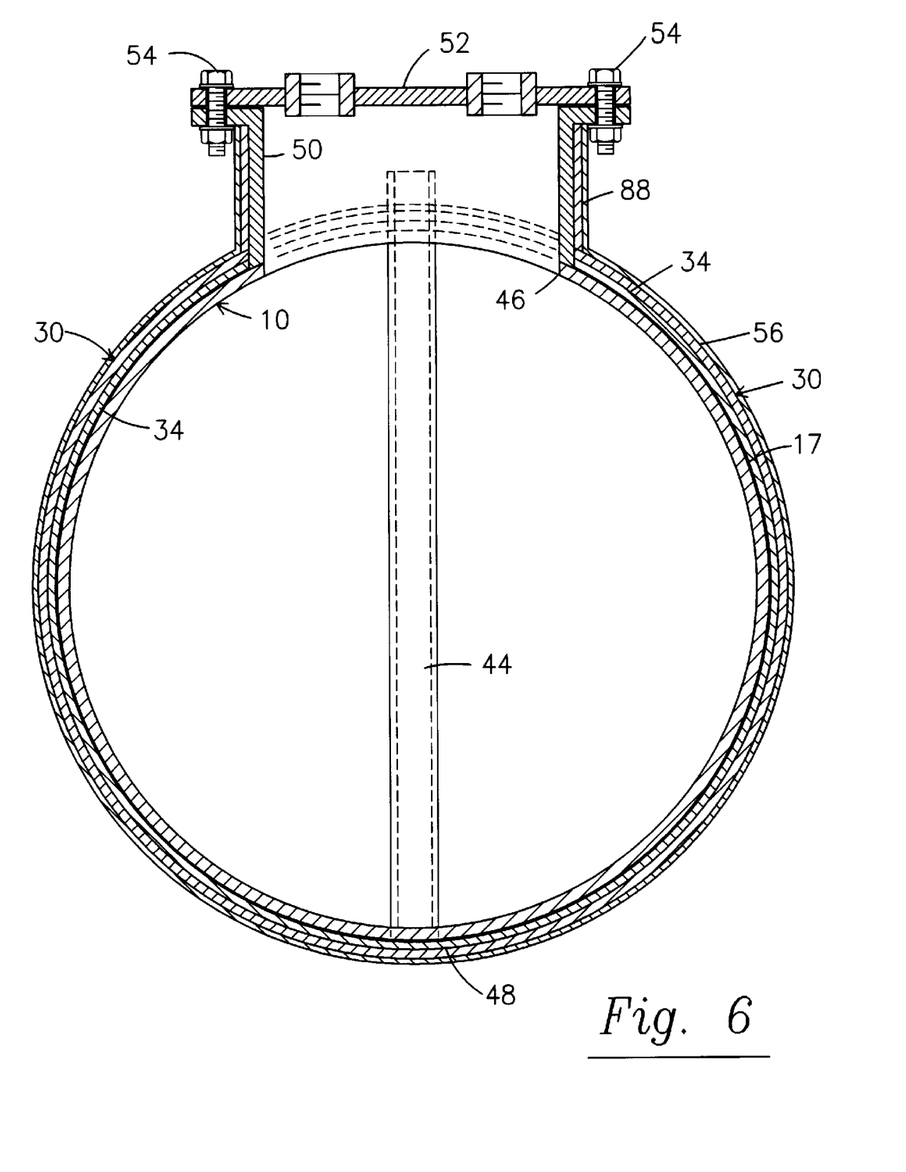
FIG. 6 is an end sectional view taken along line 6—6 of the tank of FIG. 5.
Figures 7, 8:
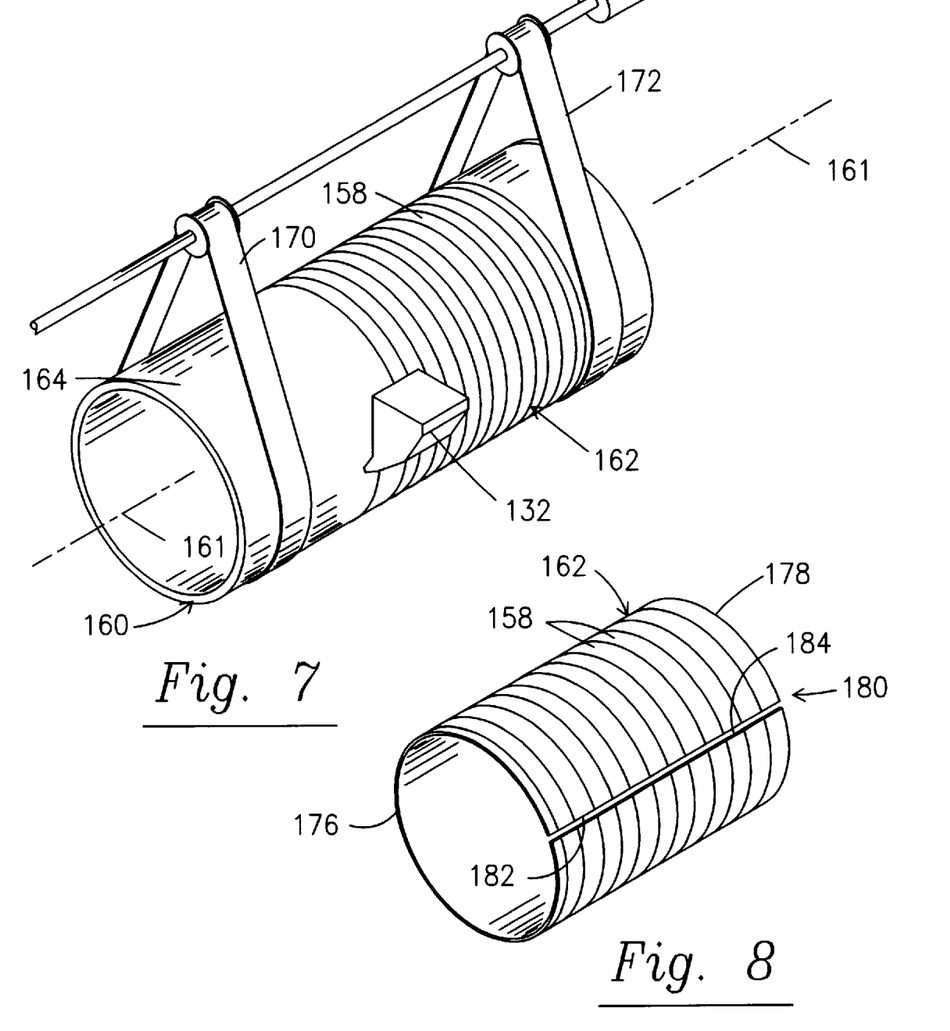
FIG. 7 is a preferred embodiment of a mold in accordance with the present invention, illustrating the extrusion process.
FIG. 8 is a side elevation of a cylindrical member cut between its end portions in accordance with the present invention.
Figures 9, 10:
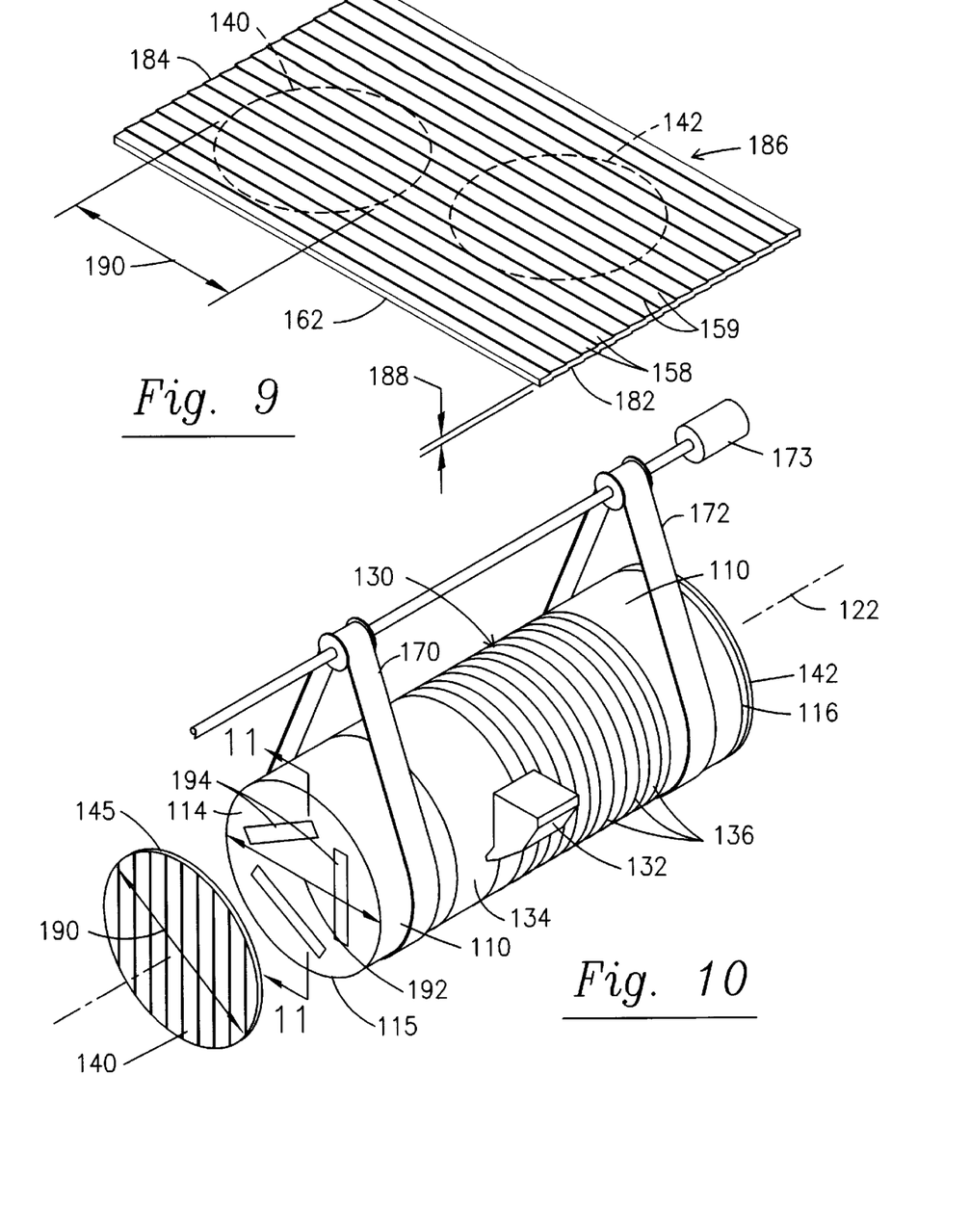
FIG. 9 is a preferred embodiment of a sheet of synthetic resin material formed in accordance with the present invention.
FIG. 10 is a side elevation, partially in section, of a preferred embodiment of a tank according to the present invention, illustrating various steps in the fabrication process.

Preferred embodiments of the apparatus of the present invention are illustrated in FIGS. 1–11, in which similar reference numbers refer to corresponding elements in the various views. FIG. 1 illustrates a tank fabricated according to a preferred method of the present invention, in which is provided a rigid inner tank, generally indicated as 10, having generally cylindrical sidewall portions 12, end portions 14 and 16, which are generally transverse to the sidewall portions 14 and 16. Elongated spindle members 18 and 20 are attached to and extend outwardly of each of the end portions 14 and 16, respectfully, generally coaxially with the central axis of the inner tank 10, illustrated as reference number 22. As illustrated in FIG. 1, the spindle members 18 and 20 may be supported by fixed supports 24 and 26 upon which the inner tank 10 may conveniently be rotated about its axis 22, such as by a motor or any conventional means, to facilitate the fabrication of the multiple wall storage tank. Alternatively, rather than having spindle members 18 and 20 attached to the end portions 14 and 16 of the inner tank 10, two or more straps, such as continuous belts, may be positioned around the tank sidewall portions 12. The straps may then be simultaneously advanced in a conventional manner in order to rotate the tank 10 generally about its longitudinal axis 22, such as is shown in FIGS. 7 and 10.

While various forms and shapes of tanks may be utilized in practicing this invention, the most common shape utilized for such storage tanks is that of a cylinder, generally a right circular cylinder, having closed end portions 14 and 16. For simplicity of illustration, this configuration of tank is utilized for illustrating a preferred embodiment of this invention. Also, while virtually any construction of rigid inner tank 10, whether metal, fiberglass or other known materials, may be utilized in practicing this invention, one preferred and readily available type of structure is a tank formed of welded steel. Although the inner tank may have a corrosion resistant coating, it is not strictly necessary because a later applied outer sheath acts as a corrosion resistant barrier. For purposes of illustration such a metal inner tank 10 will be described. It is also to be understood that the tank 10 may be a newly fabricated tank, which may or may not have a manway opening or fittings cut through it, or it may be a previously used tank removed from its prior installation and cleaned for remanufacturing in accordance with this invention.

To prepare an uncoated or previously used metal inner tank 10, it is desirable that the exterior surface of the tank be conventionally grit blasted and coated with a known rust inhibitive material. It is preferred that the spindle members 18 and 20 may be attached, suitably by welding, to the center of the end portions 14 and 16, generally coaxial with the tank axis 22, as set forth above. Where a tank includes apertures, such as a manway or other holes, it may be desirable to cover or close such apertures, such as by welding an appropriately configured sheet of steel generally flush with the inner tank exterior surface 17.

As shown in FIG. 1, the next step includes helically extruding in situ an outer sheath of a synthetic resin material, such as a thermoplastic resin, a thermosetting resin, a catalyzing resin or other appropriate synthetic resins, over the inner tank 10 as it is rotated about its axis 22, while preventing bonding between at least a substantial portion of, and preferably the entire, outer sheath 30 and the inner tank exterior surface 17. In a preferred embodiment of the present invention, synthetic resin material comprises a molten thermoplastic resin material, such as a high molecular weight (HMW) polyolefin, namely polyethylene or polypropylene, suitably having a temperature in the range from about 150 degrees Fahrenheit to about 600 degrees Fahrenheit, typically about 420 degrees Fahrenheit. Preferably, at least a portion of the outer sheath 30 is spaced from at least a portion of the inner tank exterior surface 17, suitably at least the lower portion, by a release material, generally indicated as 34. The preferred polyolefin material will not bond to the metal inner tank 10, even in the absence of such release material.

Figure 3:
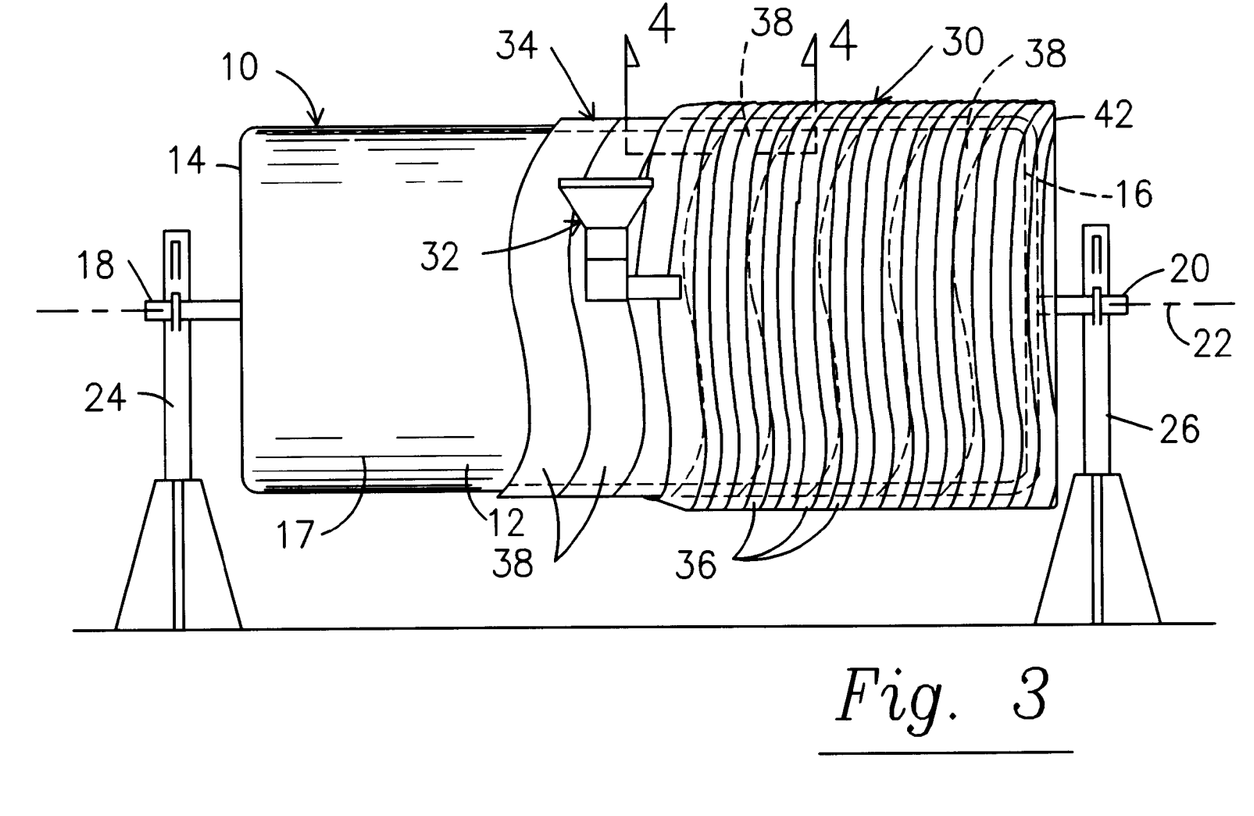
FIG. 3 is a side elevation, partially in section, of an alternative preferred embodiment of the tank of FIG. 1.

As shown in FIGS. 1 and 3, the outer sheath 30 is preferably helically extruded by a conventional extruding apparatus 32 such as, for example, extruder systems available from Genca of Clearwater, Fla., as a plurality of partially overlapping strips or layers 36. A satisfactory outer sheath may also be formed by helically extruding the layers to abut, rather than overlap, such that adjacent layers are joined and fused along their side edges generally circumferentially about tank 10 to form the continuous sidewall portion of outer sheath 30. The extruded layers 36 are conveniently heated to a molten state to facilitate bonding between the plurality of partially overlapping layers 36 to form a substantially liquid impervious outer sheath 30. In addition, after the layers 36 of outer sheath 30 have been applied over the inner tank 10 or while being applied, additional heat may be applied, to further bond the overlapping layers to provide a substantially monolithic outer sheath 30. Each extruded successive overlapping layer 36 of the outer sheath 30 has a predetermined width that is substantially less than the axial length of the cylindrical sidewall portions of inner tank 10, suitably in the range from about four inches to about twelve inches. Preferably, each successive overlapping layer 36 is extruded such that at least half, and suitably about two-thirds to about four-fifths, of the width of each layer overlaps the preceding layer, shown in FIGS. 1 and 3. Of course, a greater amount of overlap may be desirable to enhance the strength and thickness of the outer sheath 30.

Figure 2:
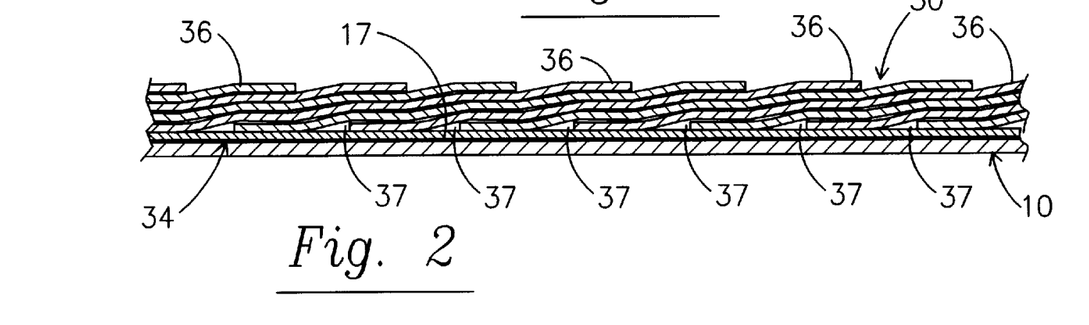
FIG. 2 is a magnified fragmentary, sectional view, taken along line 2—2 of the tank of FIG. 1, illustrating the various layers of material.
Figures 4, 5:
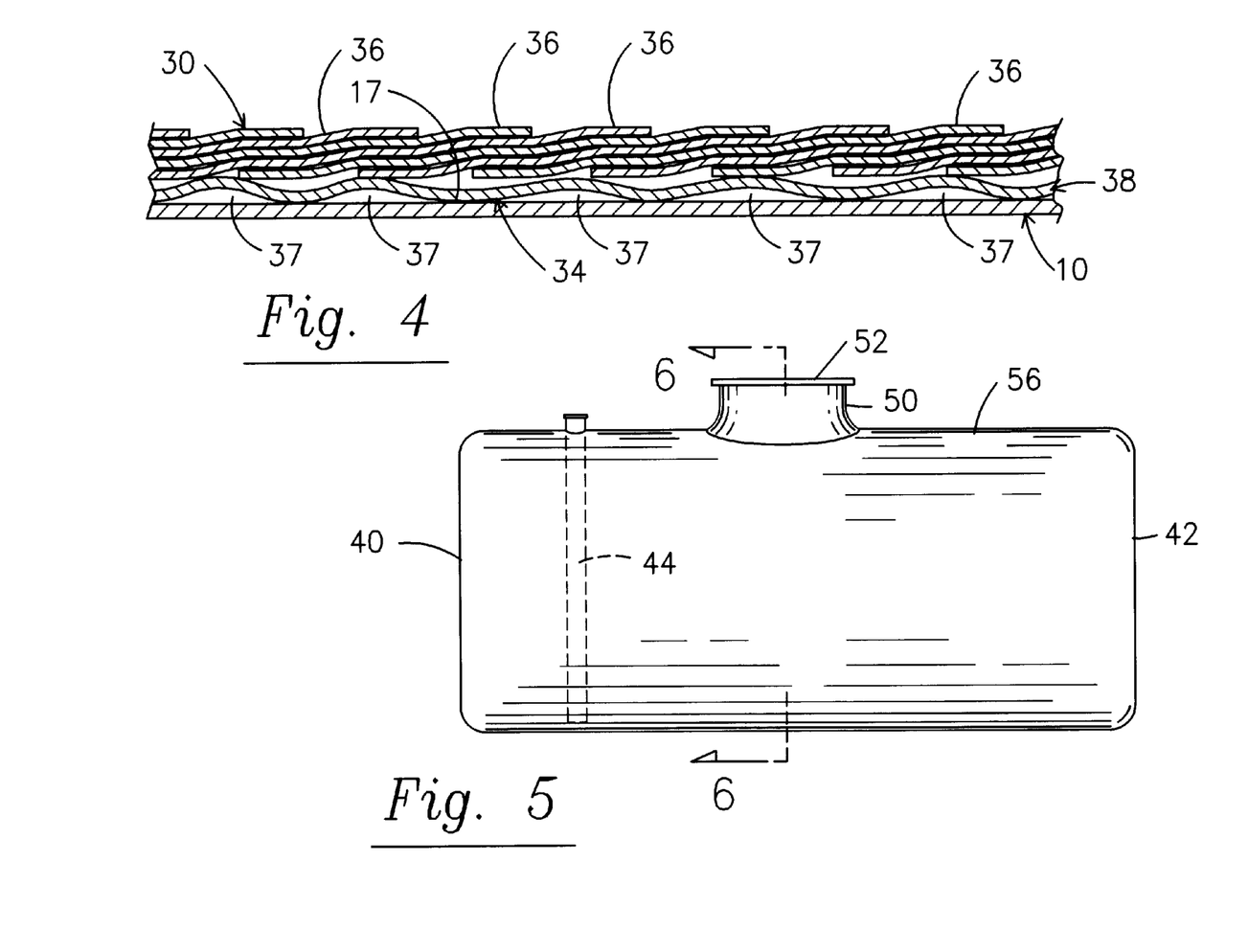
FIG. 4 is a magnified fragmentary, sectional view taken along line 4—4 of the tank of FIG. 3, illustrating the various layers of material.
FIG. 5 is a side elevation of a completed tank in accordance with the present invention.

As shown in the preferred embodiments of FIGS. 2 and 4, the plurality of partially overlapping layers 36 are extruded such that the overlapping layers 36 form a corrugated inner surface of outer sheath 30 that defines a plurality of channels 37 intermediate the outer sheath and the inner tank suitably adjacent the inner tank exterior surface 17. These channels 37 preferably extend adjacent the sidewall portions 12 generally circumferentially about inner tank 10 between the inner tank and the outer sheath 30 to provide for desired substantially free flow of liquids between the inner tank and the outer sheath as well as increase the stiffness of the outer sheath in the radial direction with respect to axis 22. A portion of the corrugated inner surface of the outer sheath, or a release material 34 attached thereto, may engage the inner tank exterior surface 17, still allowing for the flow of liquids between the inner tank 10 and outer sheath 30 within the channels 37. By modifying the amount of overlap between the extruded layers 36 of outer sheath 30, the number of channels and spacing therebetween may conveniently be increased or decreased, with a corresponding change in the strength of outer sheath 30.

As shown in FIGS. 1–4, the preferred embodiment of the present invention includes providing the release material 34 intermediate the inner tank exterior surface 17 and the subsequently applied outer sheath 30 to prevent bonding between the outer jacket 30 and the inner tank 10, and thereby effect substantially free passage of liquids along a substantial portion of the inner tank exterior surface 17. The release material 34 may conveniently be formed of any material that may prevent the bonding between the extruded outer sheath 30 and the inner tank exterior surface 17 and provide for substantially free passage of liquids along a substantial portion of the inner tank exterior surface 17. Appropriate selection of release material 34 may also provide a substrate to which a portion of the extruded layers of outer sheath 30 may bond and thereby substantially reduce sagging of extruded layers of the outer sheath as applied. Release material 34 is applied between the outer sheath 30 and the inner tank 10, which material may conveniently be applied directly to the inner tank 10 or be co-extruded with the outer sheath 34. Where release material 34 is co-extruded with or applied or co-applied to the inner surface of the outer sheath 30, release material 34 preferably is applied proximal and forward of the leading edge of each extruded layer 38 such that release material 34 does not substantially interfere with the engagement or hinder the bonding between each successive partially overlapping layer 38 and the previous layer 38. In this manner, release material 34 may prevent bonding between outer sheath 30 and inner tank 10 while not adversely affecting the bonding between successive overlapping layers of outer sheath 30.

Suitable examples of release material 34 include, without limitation conventional liquid mold release agents, silicone, polyvinyl acetate (PVA), polyolefins in the form of mesh, nets or films, grease, dust or powders, oxidation products, wax, grease as well as other release materials known in the art. The selection of an appropriate release material 34 typically will depend upon the material selected for outer sheath 30.

For example, where the outer sheath 30 is extruded as molten thermoplastic material, such as polyethylene, a preferred embodiment of release material 34 may include applying a relatively thin sheet of an imperforate material, suitably having generally smooth surfaces, over the properly prepared inner tank exterior surface 17. A suitable such imperforate material 34 should have higher melting temperature than the temperature of the molten thermoplastic outer sheath when extruded, such that, as the heated outer sheath 30 is extruded over and engages release material 34, material 34 wrinkles or forms a plurality of crinkles as shown in FIG. 4, but does not rupture. The crinkles in release material 34 define a plurality of ridges, grooves, or protrusions preferably generally circumferentially about inner tank 10 adjacent the inner surface of the outer sheath 30. The wrinkles of material 34 also preferably form corresponding ridges, grooves, or protrusions in the molten outer sheath inner surface, at least a substantial portion of which remain when cooled. The wrinkles of material 34, which may be in addition to channels 37 of the outer sheath 30, may provide for the desired substantially free flow of liquids between the outer sheath 30 and the inner tank 10. For purposes of illustration release material 34 is shown proportionally thicker than is necessary, as the sheets of the imperforate will typically have a thickness that is substantially less than outer sheath 30. The material 34 should also substantially conform to the inner surface of outer sheath 30, including within channels 37.

The release material 34 may, for example, be formed of an elongated sheet, or film, of a polyester resin material such as MYLAR®. Preferably, as shown in FIG. 3, such an elongated sheet 38 of release material is spirally wrapped around the exterior surface of tank 10 from end to end in partially overlapping layers, suitably as the tank 10 is rotated about its axis 2. This may occur before or during the extrusion of the outer sheet 30. There should be sufficient overlap between adjacent layers of sheet 38 such that at least some overlap between successive layers is maintained after the wrinkling occurs, with a portion of extruded layers bonding to the imperforate release material 34 when cooled.

To form the end portions 40 and 42 of the outer sheath 30, the synthetic resin material may simply be extruded, as shown in FIG. 1, over the inner tank end resin material portions 14 and 16. For the example when spindle members are employed to support inner tank 10, the polyethylene could be extruded from spindle member 18 to spindle member 20, forming a continuous jacket structure over the cylindrical sidewalls 12 of inner tank 10 and end walls 14 and 16. To complete the end portions 40 and 42 most of the length of each such spindle member 18 and 20 is removed from each respective end portion 14 and 16 and a patch of a substantially liquid-tight synthetic resin material, suitably polyethylene, is attached, such as by welding or heat bonding, to the end portions covering the area from where the respective spindle members 18 and 20 were removed.

Alternatively, each end portion 42 may be fabricated separately from and be bonded to the cylindrical wall of the outer sheath. This method of forming the end portions separately may simplify the manufacturing process by permitting the formation of each end cap 40 and 42 over a male mold plug that would be appropriately secured and bonded to the extruded outer sheath 30 by welding or any other manner known to those skilled in the art. While end cap 42 is illustrated in the drawings as substantially flat, it will be appreciated and understood by those skilled in the art that each end cap 42 may also be in the form of a preformed cup or dome-shaped end cap, which may have been roto-molded or thermo-formed.

A preferred embodiment for fabricating the outer tank end portions and for attaching them to the sidewall portion of the outer tank is illustrated in FIGS. 7–11, in which similar referenced characters, increased by adding 100, refer to similar structural elements throughout the various views of FIGS. 1–6. In general, each of the outer end portions 140 and 142 is preferably formed by cutting a generally circular disc from a sheet of a generally rigid synthetic resin material, such as a polyolefin material, such that each end portion 140 and 142 has an outer diameter 190 that is at least generally equal to the outer diameter 192 of the respective end portion 114 or 116 of the inner tank 110 to which it is attached, as is shown in FIG. 10. The outer end portion 140 includes a perimeter edge 145 that is positioned adjacent to the perimeter edge 115 of end portion 114 of the inner tank 110 to define a first shoulder, indicated as 147.

FIGS. 7 through 9 show a particularly preferred method for forming the sheet of material from which the end portions 140 and 142 may be formed. In general, a plurality of partially overlapping layers 158 of a molten thermoplastic synthetic resin material, such as a polyolefin material, are extruded over a mold, generally indicated as 160, while preventing bonding between the synthetic resin material 158 and the mold to form a generally rigid, elongated cylindrical member 162 around mold 160, as is shown in FIG. 7. Mold 160 preferably includes a rigid cylindrical sidewall portion 164, suitably formed of steel, and is dimensioned and configured to have a circumferential area sufficient to form about at least two, and preferably three, discs for use as outer tank end portions. The exterior surface of the mold cylindrical sidewall portion 164 may also conveniently be textured, which may include ridges, grooves, dimples or projections, to form a stand-off or spacing means between the inner surface of the outer tank end portions 142 and 143 and the respective inner tank end portions 114 and 116. A release material, such as those described herein, may also be employed to prevent bonding between the extruded layers 158 and the mold sidewall portion 164 and to provide a substrate to which the extruded material may attach.

The extrusion process associated with forming end caps 140 and 142 is substantially identical to that described with respect to the outer sheath sidewall portion, in which a plurality of partially overlapping layers 158 are extruded to form a corrugated inner surface defining a plurality of generally circumferential channels 159 between the mold 160 and the resulting member 162. The layers 158 are applied by a conventional extrusion device 132 as the mold is rotated about its axis 161. One preferred method for rotating the mold about its axis 161 includes, for example, positioning at least two moveable straps, such as continuous belts 170 and 172 shown in FIG. 7, that engage the lower portion of the mold and may be rotated by a common drive mechanism, schematically illustrated as 173. The layers 158 are extruded over the portion of the mold 160 not covered by straps 170 and 172, such as the area between the straps, as the mold is rotated. After that area is extruded and the material has sufficiently cooled and hardened, which typically occurs in about ten to about fifteen minutes, straps 170 and 172 may be moved to engage the previously extruded and hardened middle portion, so that the non-extruded outer sidewall portions 164 of mold 160 may be appropriately covered by extruding additional molten polyolefin resin material layers 158. The additional molten extruded material layers 158 are applied to overlap a portion of the previously extruded layers and, because of the heat and the properties of the material, the new layers easily sealingly bond, and preferably fuse, to the previously extruded layers to form the generally rigid, elongated and continuous cylindrical member 162, as is shown in FIGS. 7 and 8. Of course, additional heat may be applied by a conventional source, such as an infrared heating instrument.

An alternative method for rotating the mold 160 about its axis 161, may include, for example, supporting the mold with a plurality of pairs of opposed rollable supports that engage the lower portion of the mold 160, with at least one roller of each opposed pair being driven by a common drive mechanism. During the extrusion process, the pair of rollers near the extrusion apparatus 132 may disengage and be positioned away from mold 160, such that that pair of rollers do not contact the molten extruded material, allowing it to properly cure along the mold sidewall portion 164. Typically, while the synthetic resin material is being extruded, at least one pair of rollers will be disengaged from mold 160, which roller pairs may contact the extruded layers 158 after they have sufficiently cooled.

Once the generally rigid, elongated cylindrical member 162 has cooled, it is cut longitudinally between end portions 176 and 178 to define an elongated cut, indicated as 180 in FIG. 8. Cut 180 may conveniently be made while the generally rigid member 162 is on or off the mold 160. In order to facilitate the removal of generally rigid member 162 from mold 160, mold 160 may be radially collapsible with respect to axis 161. Alternatively, generally rigid member 162 may simply be urged from mold 160, as member 162 should not bond to mold 160. An high molecular weight polyolefin material, which is preferably extruded over mold 160, should not bond to a metallic substrate, especially where an appropriate release material is applied to mold 160 prior to, or while extruding layers 158 thereupon.

Elongated cut 180 in generally rigid member 162 defines two cut edges 182 and 184 along opposed sides of cut 180. Cut edges 182 and 184 may be urged apart from each other in order to orient the rigid member 162 into a generally flat position to define a sheet, generally indicated as 186 in FIG. 9, of the synthetic resin material, with the channels defined by adjacent extruded layers extending between ends 182 and 184. Member 162 is sufficiently flexible to be flattened into sheet 186 without fracturing or losing rigidity, particularly because it preferably is dimensioned and configured to have a predetermined diameter, such as about 8 feet, and a predetermined thickness 188 of about ⅛ of an inch to about ¼ of an inch. Once member 162 is urged into sheet 186, conventional weights may be positioned upon portions of sheet 186 to maintain it in the desired generally flat position. Next, a portion of sheet of 186 may be cut, suitably by a conventional shearing device or router, according to the dimensions of the inner tank end portion 114 and 116 to form outer end portions 140 and 142. The diameter 190 of outer end portion 140 should be cut to at least generally equal to, and preferably greater than, the diameter 192 of inner tank end portion 114 to which it will be attached, as it is difficult in practice to center the outer end portion 140 over inner end portion 114. For example, where inner tank end portions 114 and 116 each has about an 8 foot outer diameter, outer tank end portions 140 and 142 each may have about 8 foot 2 inch diameters.

The formation of sheet 186 as well as the end caps 140 and 142 may be facilitated by the application of heat and pressure or vacuum. For example by applying heat and pressure or vacuum to the desired HMW thermoplastic material, protrusions may be added to the inner surface of the end caps or the end caps 140 and 142 may be formed into dome or cup-shaped end caps. Similarly, an application of appropriate heat and pressure or vacuum also may be used to urge the cylindrical member 162 into the desired flat sheet 186. The preferred HMW material may be manipulated repeatedly by such a process without a significant decrease in the structural and chemical properties of the material.

Fasteners, which may include screws, clamps, a conventional adhesive material, suction or other fasteners known in the art, may be used to attach outer end portions 140 and 142 to inner tank end portions 114 and 116, respectively. The preferred fastener shown in FIG. 10 includes an adhesive material 194, which may conveniently be in the form of an industrial strength double-sided adhesive tape, such as is commercially available from 3M. The adhesive material need not provide a permanent means of attachment between the outer tank end portions 140 and 142 and the inner tank, as it need only temporarily attach the outer tank end portions until the outer sheath sidewall portions 130 may be applied and bond to the outer sheath end portions 140 and 142. Prior to attaching the outer end portions 140 and 142 to the respective inner tank end portions 114 and 116, the inner tank end portions may be cleaned and an appropriate primer material, such as a synthetic polymer or conventional heptane material, namely POLILITE™ from Ashland Chemical, may be applied to the inner tank end portions 114 and 116 to facilitate the attachment of the adhesive material 194. After the outer end portions 140 and 142 are attached to the inner tank end portions 114 and 116, respectfully, outer end portions 140 and 142 may be cut, such as by a router, to the particular dimensions of each respective inner tank end portion 114 and 116. In this way the outer tank end portion outer diameter 192 will be substantially equal to the inner tank end portion outer diameter 192. Preferably, outer end portions 140 and 142 are attached to inner tank 110, such that the channels 159 are oriented longitudinally between the upper and lower portions of the completed tank.

Figure 11:
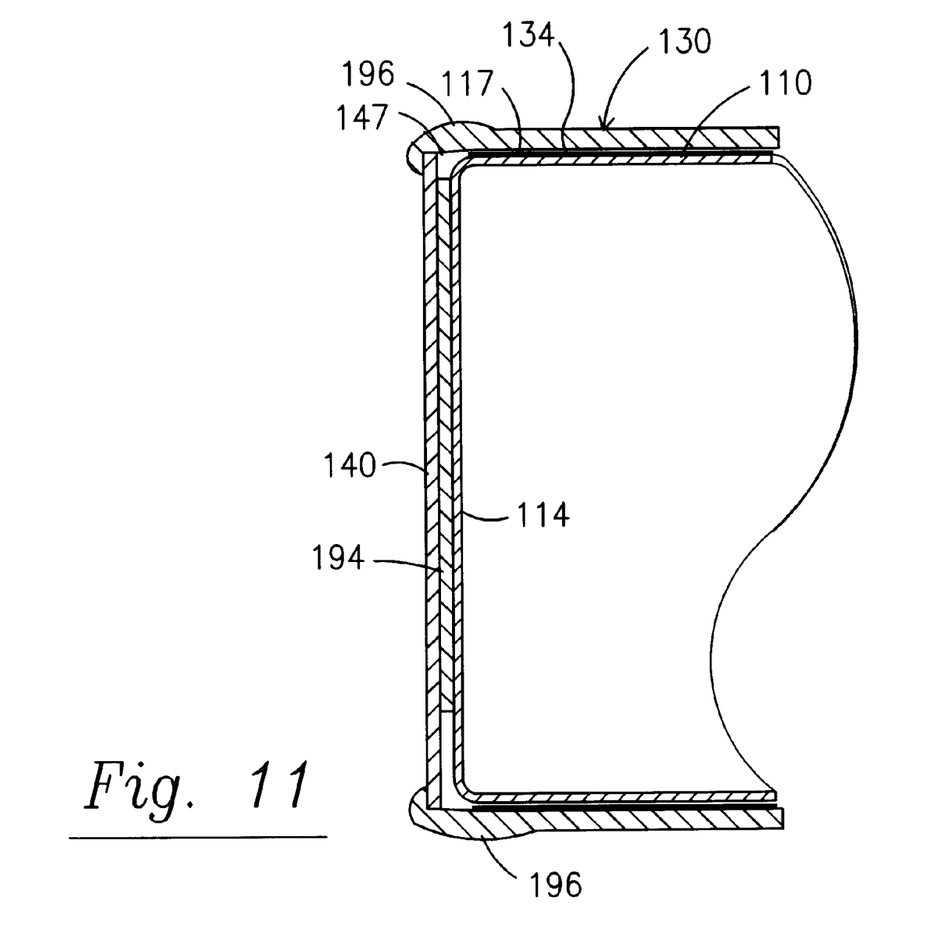
FIG. 11 is a partial side sectional view taken along line 11—11 of the completed tank of FIG. 10.

After the outer tank end portions 140 and 142 are attached to end portions 114 and 116, respectively, the outer sheath may conveniently be extruded over the inner tank 110 as shown in FIGS. 10 and 11. This extrusion process may be substantially identical to that described with respect to FIGS. 1 and 7. In order to ensure a substantially liquid-impervious seal between the outer sheath sidewall 130 and the end portions 140 and 142, an additional plurality of layers of the molten synthetic resin material, generally indicated as 196 in FIG. 11, may be extruded around the inner tank 110 proximal shoulder 147, forming a thicker region in outer sheath 130 proximal end portions 140 and 142. Preferably, at least a portion of the additional layers 196 sealingly bond, and preferably fuse, to the outer end portion 140 proximal shoulder 147 due to the heat of the molten material being applied, having a temperature from about 150° F. to about 600° F., typically about 420° F. Accordingly, a seal is formed between the outer sheath cylindrical sidewall portions 130 and the outer sheath end portion 140 proximal to the first outer end portion perimeter edge 145. The same thermoplastic synthetic resin material, such as the high molecular weight polyolefin resin described above, may conveniently be used to form both the outer sheath end portions 140 and 142 and the outer sheath cylindrical sidewall portion 130, thereby enhancing the bonding of these portions. Conventional methods for forming end caps including roto-molding and thermo-forming, have heretofore been unable to take advantage of the material properties of the high molecular weigh polyolefin materials described herein, as it is difficult, if not impossible, to form end caps of such materials by such conventional methods.

As shown in FIGS. 5 and 6 the completed view of a preferred embodiment of the tank may include a pipe or tube 44 extending through the tank itself for use in monitoring and detecting the presence of liquids or a change in pressure in the volume between inner tank 10 and the outer sheath. The tube 44 may conveniently be installed into an aperture 46 formed through the tank, which aperture suitably may include a threaded fitting. The tube 44 is inserted through the outer sheath 30 and aperture 46 and conveniently extends through and is sealed to an aperture formed in the lowermost portion of inner tank 10 so that the lower portion of tube 44 is positioned between the inner tank 10 and the outer sheath 30. Substantially, liquid-tight joints between the tube 44 and the inner tank 10 are formed in a conventional manner, such as by welding to the inner tank 10. The tube 44 may conveniently extend completely through the inner tank 10 and into the interstitial space 48 between the outer sheath 30 and the inner tank 10 to test for fluids or changes in pressure, such that liquid disposed within the interstitial space may conveniently be detected by apparatus within or connected to tube 44 or contacted by and withdrawn through the tube 44.

The remaining steps involved in the manufacture of the tank of the present invention generally depend upon the nature of the inner tank 10 used in manufacturing multiple wall storage tank of the present invention. In general, if not already done, appropriate holes may be cut by any suitable means, such as a hole saw or the like, to define or reform apertures. Then, suitable piping and a cylindrical member 52, such as for a manway, may be appropriately secured, suitably by welding or threading to the apertures of the tank. In addition, the piping or manway may be secured to the inner tank 10, such as by threading or welding. A cover plate 52 may conveniently be secured to the upper flange of the cylindrical member 50 by a conventional means, such as bolts 54. When all the fittings and cover plates are secured to the tank, an appropriate resin 56 may be applied over the tank to yield a finished structure such as shown in the views of FIGS. 5 and 6.

By the foregoing construction there is provided a multiple wall tank that can be manufactured economically from a conventional single wall tank, and even from a used tank that has previously been removed from underground storage use. This structure provides an extruded outer sheath, which may be formed from a material that is free of tendency to rust or corrode, and at least a portion of which may be free from the inner tank exterior surface to define an interstitial space in which the collection and detection of liquids may be determined, such as by simply detecting the presence of liquids or a change in pressure within that space. In addition, by increasing the number and/or thickness of overlapping layers in the outer sheath, its strength and integrity may be further enhanced.

While the foregoing describes in detail preferred embodiments of the present invention, it is to be understood that such description is illustrative only of the principles of the invention and is not to be considered limitative thereof. Because numerous variations and modifications of the present invention will readily occur to those skilled in the art, the scope of this invention is to be limited solely by the claims appended hereto.

What is claimed:

1. A method for making a double wall tank for the storage of liquids comprising the steps of:

providing a generally rigid, cylindrical inner tank having elongated cylindrical sidewall portion, two generally opposed closed end portions generally transverse to said sidewall portion, and a central axis extending longitudinally through said end portions, with each said inner tank end portion having a perimeter edge and a predetermined outer diameter;

attaching a first outer end portion of a generally rigid synthetic resin material to one of said inner tank end portions, said first outer end portion having a predetermined diameter at least generally equal to said diameter of said one end portion of said inner tank, and said first outer end portion having a perimeter edge positioned adjacent said perimeter edge of said one end portion of said inner tank to define a first shoulder;

helically extruding an outer sheath of a plurality of layers of a first molten thermoplastic synthetic resin material around said inner tank sidewall portion while preventing bonding between a substantial portion of said first synthetic resin material layers and said inner tank, with a first additional plurality of layers of said first molten synthetic resin material being extruded around said inner tank proximal said first shoulder, such that at least a portion of said first molten synthetic resin material fuses to said first outer end portion proximal said first shoulder, whereby a seal is formed between the outer sheath and the first outer end portion proximal the first outer end portion perimeter edge.

2. A method as in claim 1 further comprising the steps of:

attaching a second outer end portion of a generally rigid synthetic resin material to the other of said inner tank end portions, said second outer end portion having a predetermined diameter at least generally equal to said diameter of said other end portion of said inner tank, and said second outer end portion having a perimeter edge positioned adjacent said perimeter edge of said inner tank other end portion to define a second shoulder;

helically extruding a second additional plurality of layers of said first molten synthetic resin material around said inner tank proximal said shoulder, such that at least a portion of said first molten synthetic resin material fuses to said second outer end portion proximal said second shoulder, whereby a seal is formed between the outer sheath and the second outer end portion to enclose the inner tank within the outer sheath.

3. A method as in claim 1 further comprising the steps of:

prior to said attaching step, helically extruding a plurality of layers of a second molten synthetic resin material over a generally cylindrical and elongated mold while preventing bonding between said second synthetic resin material and said mold to form a generally rigid, elongated cylindrical member having two open ends, an inner surface and a longitudinal axis extending through said open ends, longitudinally cutting said generally rigid member between said two open ends thereof to define an elongated cut, with said generally rigid member having two cut edges along opposed sides of said elongated cut, urging said cut edges of said generally rigid member apart from each other to orient said generally rigid member into a generally flat position to define a sheet of said second synthetic resin material, and cutting a portion of said sheet according to the dimensions of said one end portion of said inner tank to form said first outer end portion.

4. A method as in claim 3 wherein said plurality of layers of said second synthetic resin material are extruded as partially overlapping layers, such that said partially overlapping layers form a generally rigid cylindrical member having a corrugated inner surface with corrugations extending in a generally circumferential direction around said mold, whereby said longitudinal cutting step orients said corrugations extending generally longitudinally between said cut edges of said generally rigid member.

5. A method as in claim 1 wherein said diameter of said first outer end portion is greater than said diameter of said one end portion of said inner tank, and subsequent to said attaching step, said method further comprises cutting said first outer end portion adjacent said perimeter of said inner tank one end portion, such that said one end portion diameter of said inner tank and said first outer end portion diameter are generally equal.

6. A method as in claim 1 wherein said synthetic resin material of said first outer end portion comprises a polyolefin material.

7. A method as in claim 1 further comprising the step of interposing an adhesive material between said one end portion of said inner tank and said first outer end portion.

8. A method as in claim 7 wherein said adhesive material comprises a double-sided adhesive tape sufficient for temporarily attaching said first outer end portion to said one end portion of said inner tank.

9. A method as in claim 7 wherein prior to said step of applying said adhesive material, said method comprises applying a primer material to said end portions of said inner tank to facilitate the attachment of said adhesive material to said inner tank end portions.

10. A double wall tank for the storage of liquids comprising:

a generally rigid, inner tank having an elongated cylindrical sidewall portion, two generally opposed end portions generally transverse to said sidewall portion, and a longitudinal central axis extending through said inner tank end portions, said inner tank having an axial length, with each said inner tank end portion having a perimeter edge and a predetermined outer diameter, and an outer sheath comprising:

two generally opposed end portions of a first extruded synthetic resin material, each outer sheath end portion positioned adjacent and in overlying relation to a respective one of said inner tank end portions, each said outer sheath end portion having a predetermined diameter generally equal to said outer diameter of the respective said inner tank end portion and having a perimeter edge positioned adjacent said perimeter edge the respective said inner tank end portion to define a shoulder, and a cylindrical sidewall portion surrounding said inner tank sidewall portion and said shoulder, said outer sheath sidewall portion comprising a plurality extruded layers of a second, thermoplastic synthetic resin material surrounding said inner tank and said shoulder, each said adjacent layer being extruded in molten form and having a width substantially less than said inner tank axial length, with at least a substantial portion of said outer sheath sidewall portion being detached from said inner tank to provide for substantially free flow of liquids between said inner tank and said outer sheath, with an additional plurality of layers of said synthetic resin material being extruded around said inner tank proximal to and over said shoulder, with a portion of said additional plurality of layers being fused to a portion of said outer sheath end portions proximal each respective said shoulder, thereby defining a substantially liquid-impervious seal between said outer sheath cylindrical sidewall portion and said outer sheath end portions.

11. A tank as in claim 10 wherein said plurality of adjacent layers are extruded as partially overlapping layers, such that said overlapping layers form an outer sheath sidewall portion having a corrugated inner surface with corrugations extending around said inner tank in a generally circumferential direction, with said corrugations providing for substantially free flow of liquids between said inner tank sidewall portion and said outer sheath sidewall portion.

12. A tank as in claim 11 wherein said corrugated inner surface of said outer sheath sidewall portion defines a plurality of generally circumferential channels intermediate said outer sheath and said inner tank to provide for substan tially free flow of liquids between said inner tank and said outer sheath.

13. A tank as in claim 10 wherein said second synthetic resin material comprises a polyolefin material.

14. A tank as in claim 13 wherein said first synthetic resin material comprises a polyolefin material fusible to said second synthetic resin material.

15. A tank as in claim 10 wherein
   said outer sheath comprises an upper portion and a lower portion; and
   said first extruded material of each said outer sheath end portion comprises a corrugated inner surface having a plurality of generally parallel channels, said channels being oriented generally longitudinally between said outer sheath upper and lower portions to provide for substantially free passage of liquids between said inner tank end portions and the respective outer sheath end portions.

* * * * *